US011233363B2

(12) United States Patent
Atala et al.

(10) Patent No.: US 11,233,363 B2
(45) Date of Patent: Jan. 25, 2022

(54) ALUMINUM ALLOY HEADER PLATE WITH CERAMIC COATING FOR BATTERY ASSEMBLY

(71) Applicant: Ford Global Technologies, LLC, Dearborn, MI (US)

(72) Inventors: Mohd Atala, Canton, MI (US); Kimberly Ann Lazarz, Ypsilanti, MI (US); Michael Barr, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 16/578,448

(22) Filed: Sep. 23, 2019

(65) Prior Publication Data

US 2021/0091380 A1 Mar. 25, 2021

(51) Int. Cl.
*H01R 13/74* (2006.01)
*H01M 50/172* (2021.01)
(Continued)

(52) U.S. Cl.
CPC ............. *H01R 13/74* (2013.01); *B60L 50/64* (2019.02); *H01M 10/4207* (2013.01); *H01M 50/172* (2021.01); *H01M 50/20* (2021.01); *H01M 50/204* (2021.01); *B60L 50/50* (2019.02); *C22C 21/00* (2013.01); *C22C 21/12* (2013.01); *H01M 50/224* (2021.01); *H01M 50/249* (2021.01); *H01M 2220/20* (2013.01)

(58) Field of Classification Search
CPC .... H01M 4/463; H01M 50/172; H01M 50/20; H01M 4/664; H01M 50/204; H01M 2220/20; H01M 50/249; H01M 10/4207; H01R 13/74; B60L 50/64
See application file for complete search history.

(56) References Cited

U.S. PATENT DOCUMENTS 2,421,719 A * 6/1947 Simmons ................. C23D 3/00
428/428
4,472,486 A * 9/1984 Orsino ................. H01M 50/112
429/179
(Continued)

FOREIGN PATENT DOCUMENTS

CN 202721207 U 2/2013
CN 107749457 A 3/2018
WO WO-2014162963 A1 * 10/2014 .............. B60L 58/18

OTHER PUBLICATIONS

Knapp, Andrea; "Delphi's Innovative K-Alloy SP Now Available for Sand Casting and Permanent Mold Processes"; Thomas Net; Delphi Automotive PLC; Feb. 18, 2010 <https://news.thomasnet.com/companystory/delphi-s-innovative-k-alloy-sp-now-available-for-sand-casting-and-permanent-mold-processes-831761> (Year: 2010).*

(Continued)

*Primary Examiner* — Magali P Slawski
*Assistant Examiner* — Jessie L. Walls
(74) *Attorney, Agent, or Firm* — David B. Kelley; Carlson, Gaskey & Olds, P.C.

(57) ABSTRACT

This disclosure relates to a battery assembly with an aluminum (Al) alloy, ceramic coated header plate. An example battery assembly includes a plate, which may be referred to as a header plate, configured to support an electrical connector. The plate includes aluminum (Al) alloy and is coated with a layer of ceramic material.

16 Claims, 5 Drawing Sheets

(51) Int. Cl.
  *H01M 50/204* (2021.01)
  *H01M 50/249* (2021.01)
  *C22C 21/00* (2006.01)
  *C22C 21/12* (2006.01)
  *H01M 50/20* (2021.01)
  *B60L 50/64* (2019.01)
  *H01M 10/42* (2006.01)
  *B60L 50/50* (2019.01)
  *H01M 50/224* (2021.01)

(56) References Cited

U.S. PATENT DOCUMENTS

| | | | | |
|---|---|---|---|---|
| 5,266,053 A | * | 11/1993 | Jamet | H01R 13/74 |
| | | | | 439/607.36 |
| 9,915,007 B2 | | 3/2018 | Heitzenrater et al. | |
| 2009/0180265 A1 | * | 7/2009 | Chlumsky | H05K 5/0082 |
| | | | | 361/759 |
| 2011/0300426 A1 | * | 12/2011 | Iwasa | B60L 58/21 |
| | | | | 429/99 |
| 2015/0182996 A1 | * | 7/2015 | Deshpande | C22C 21/06 |
| | | | | 216/39 |
| 2016/0376720 A1 | * | 12/2016 | Heitzenrater | C25D 9/12 |
| | | | | 74/606 R |
| 2017/0025663 A1 | * | 1/2017 | Kim | H01R 13/5202 |
| 2017/0033497 A1 | | 2/2017 | Germani | |
| 2018/0269703 A1 | * | 9/2018 | Nook | H01M 50/543 |
| 2020/0059020 A1 | * | 2/2020 | Hammerschmied | H01R 13/74 |
| 2020/0091483 A1 | * | 3/2020 | Tamaki | H01M 50/383 |

OTHER PUBLICATIONS

"K-Alloy Properties", Dynacast, <https://www.dynacast.com/en/knowledge-center/material-information/die-cast-metals/aluminum-die-casting-metals/k-alloy> (Year: 2019).*

Wally Huskonen, "Innovative Aluminum Diecasting Alloy Resists Corrosion"; Foundry Management and Technolody, Oct. 2, 2008, <https://www.foundrymag.com/issues-and-ideas/article/21925328/innovative-aluminum-diecasting-alloy-resists-corrosion>(Year: 2008).*

Kukalis, John. "Battery Electric Vehicles Charge Ahead with Functional Coatings," Henkel Adhesive Technologies Blog—North America, Mar. 7, 2019, downloaded from henkeladhesivesna.com/blog/battery-electric-vehicles-charge-ahead-functional-coatings/ on Jun. 27, 2019.

* cited by examiner

ALUMINUM ALLOY HEADER PLATE WITH CERAMIC COATING FOR BATTERY ASSEMBLY

TECHNICAL FIELD

This disclosure relates to a battery assembly with an aluminum (Al) alloy, ceramic coated header plate.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

SUMMARY

An assembly for an electrified vehicle according to an exemplary aspect of the present disclosure includes, among other things, a plate configured to support an electrical connector. The plate includes aluminum (Al) alloy and is coated with a layer of ceramic material.

In a further non-limiting embodiment of the foregoing assembly, the ceramic material is an electro ceramic coating (ECC).

In a further non-limiting embodiment of any of the foregoing assemblies, the layer of ceramic material has a thickness of between 3 to 50 μm.

In a further non-limiting embodiment of any of the foregoing assemblies, the layer of ceramic material has a thickness of about 8 μm.

In a further non-limiting embodiment of any of the foregoing assemblies, the electrical connector is made of a plastic material.

In a further non-limiting embodiment of any of the foregoing assemblies, the plate is made of A304.

In a further non-limiting embodiment of any of the foregoing assemblies, the plate is made of an aluminum (Al) alloy with less than 0.10 weight percent of copper (Cu).

In a further non-limiting embodiment of any of the foregoing assemblies, the plate is made of an aluminum (Al) alloy with less than or equal to 0.08 weight percent of copper (Cu).

In a further non-limiting embodiment of any of the foregoing assemblies, the plate includes an opening sized and shaped to receive the electrical connector.

In a further non-limiting embodiment of any of the foregoing assemblies, the electrical connector is snap-fit to the plate.

In a further non-limiting embodiment of any of the foregoing assemblies, the electrical connector is connected to the plate by at least one fastener.

In a further non-limiting embodiment of any of the foregoing assemblies, a seal is between the plate and the electrical connector.

In a further non-limiting embodiment of any of the foregoing assemblies, the plate is a header plate and is mounted adjacent an underbody of the electrified vehicle.

In a further non-limiting embodiment of any of the foregoing assemblies, the assembly includes a wall and a plurality of battery cells arranged within the wall, wherein the header plate is attached to the wall and the electrical connector electronically connects the battery cells to at least one electronic component outside the wall.

An electrified vehicle according to an exemplary aspect of the present disclosure includes, among other things, a battery assembly arranged adjacent an underbody of the electrified vehicle. The battery assembly includes a wall, a plurality of battery cells arranged within the wall, an electrical connector, and a plate connected to the wall and the electrical connector. The electrical connector electronically connects the battery cells to at least one electronic component outside the wall, and wherein the plate includes aluminum (Al) alloy and is coated with a layer of ceramic material.

In a further non-limiting embodiment of the foregoing electrified vehicle, the ceramic material is an electro ceramic coating (ECC), and wherein the plate is made of A304.

In a further non-limiting embodiment of any of the foregoing electrified vehicles, the layer of ceramic material has a thickness of about 8 μm.

In a further non-limiting embodiment of any of the foregoing electrified vehicles, the electrical connector is made of a plastic material.

In a further non-limiting embodiment of any of the foregoing electrified vehicles, the plate is made of an aluminum (Al) alloy with less than 0.10 weight percent of copper (Cu).

In a further non-limiting embodiment of any of the foregoing electrified vehicles, the plate is made of an aluminum (Al) alloy with less than or equal to 0.08 weight percent of copper (Cu).

DETAILED DESCRIPTION

This disclosure relates to a battery assembly with an aluminum (Al) alloy, ceramic coated header plate. An example battery assembly includes a plate, which may be referred to as a header plate, configured to support an electrical connector. The plate includes aluminum (Al) alloy and is coated with a layer of ceramic material. This arrangement maintains the integrity of a seal between the plate and the electrical connector, in particular by resisting corrosion, and is particularly useful in corrosive environments such as those near a vehicle underbody.

Figure 1:
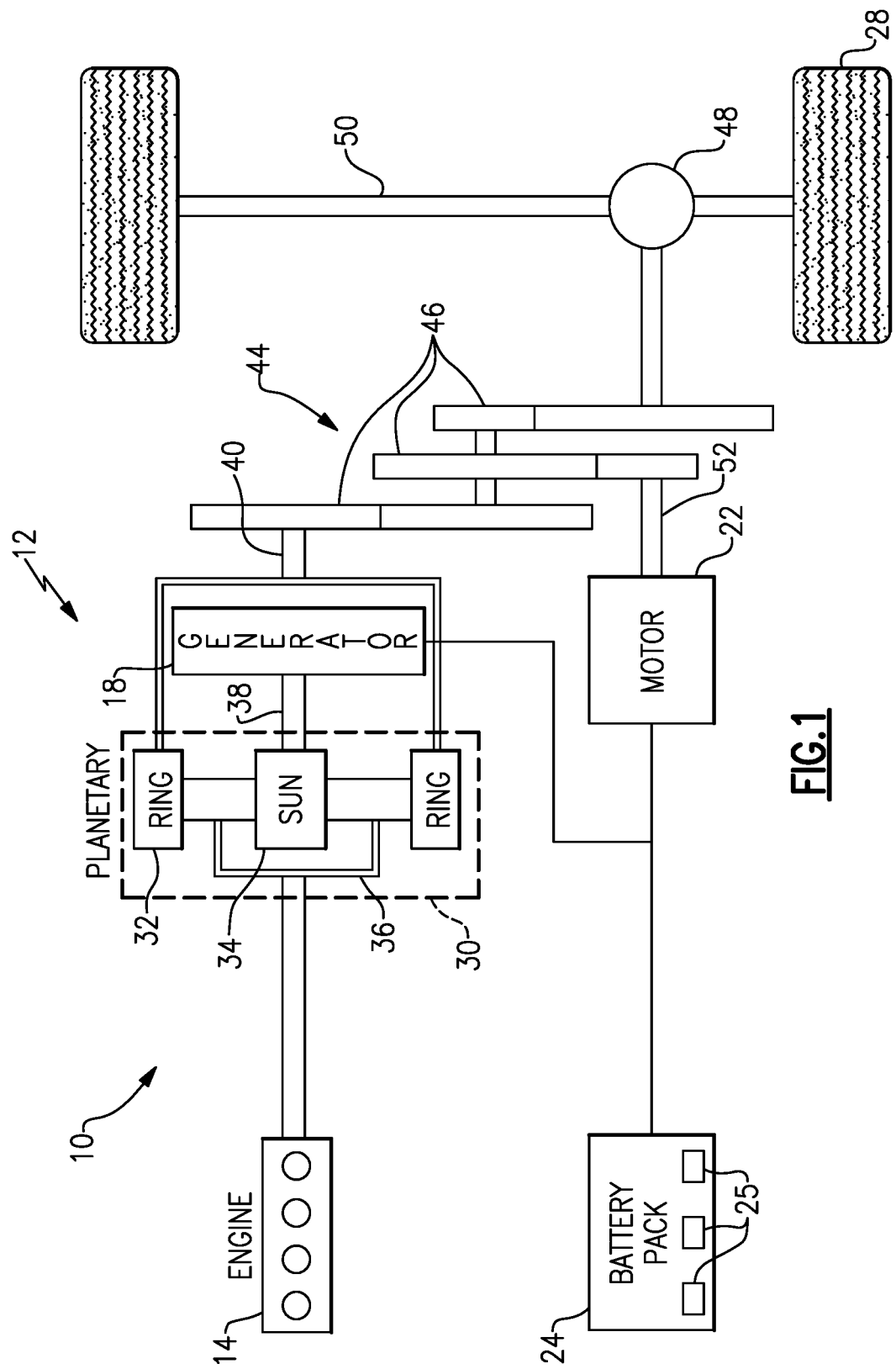
FIG. 1 schematically illustrates an example powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
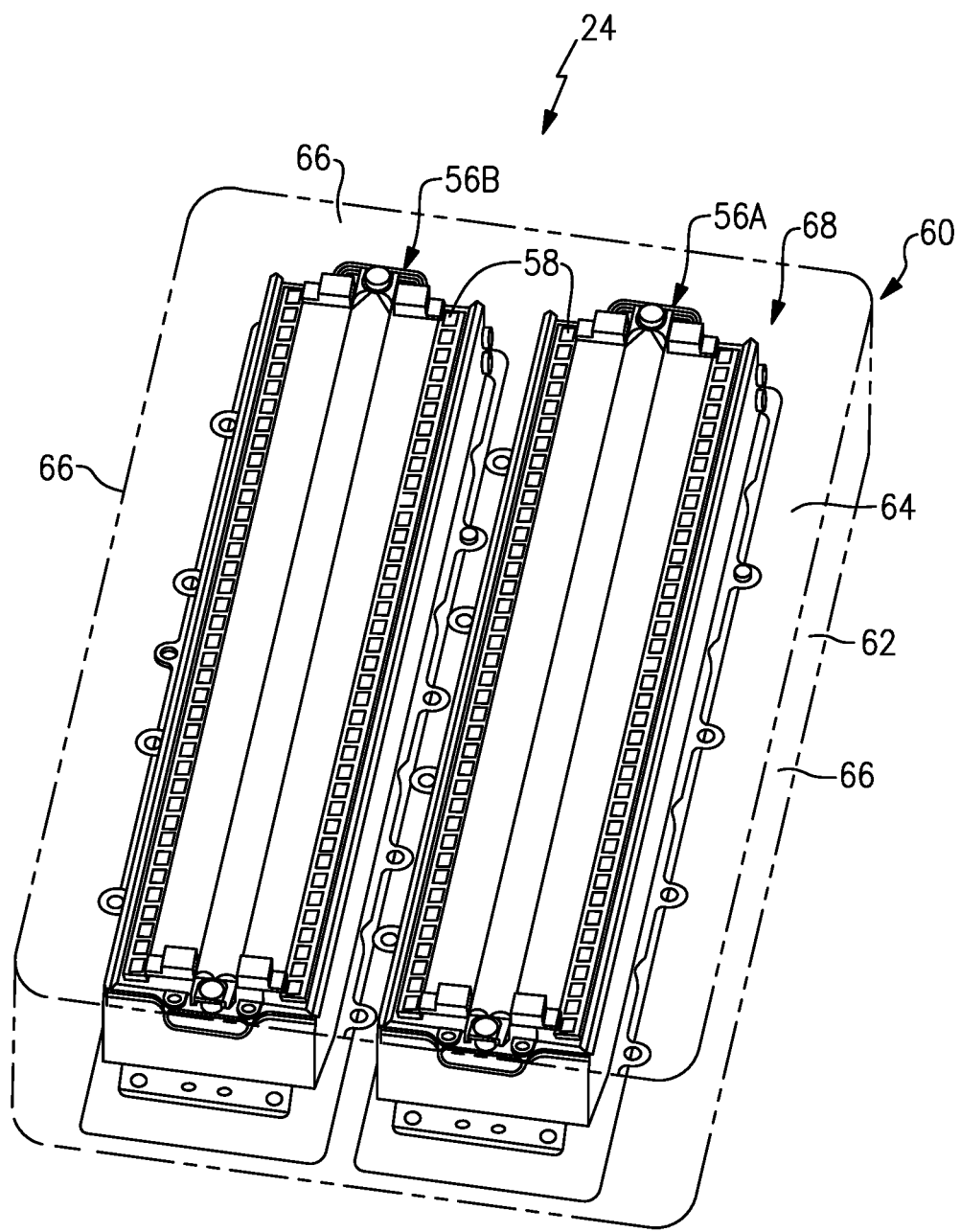
FIG. 2 schematically illustrates an example battery assembly of the electrified vehicle.

FIG. 2 illustrates additional detail of the battery assembly 24. The battery assembly 24 includes battery arrays, which can be described as groupings of battery cells, for supplying electrical power to various vehicle components. In this example there are two battery arrays 56A, 56B. Although two battery arrays 56A, 56B are illustrated in FIG. 2, the battery assembly 24 could include a single battery array or multiple battery arrays. In other words, this disclosure is not limited to the specific configuration shown in FIG. 2.

Each battery array 56A, 56B includes a plurality of battery cells 58 that may be stacked side-by-side along a span length (i.e., the largest dimension) of each battery array 56A, 56B. Although not shown in the schematic depiction of FIG. 2, the battery cells 58 are electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 (shown in phantom in FIG. 2) surrounds the battery arrays 56A, 56B. In one non-limiting embodiment, the enclosure assembly 60 includes a tray 62 and a cover 64 which establish a plurality of walls 66 that surround the interior 68 (i.e., area inside the walls 66). The enclosure assembly 60 may take any size, shape or configuration, and is not limited to the specific configuration of FIG. 2. The enclosure assembly 60 defines an interior 68 for housing the battery arrays 56A, 56B and, potentially, any other components of the battery assembly 24.

Figure 3:
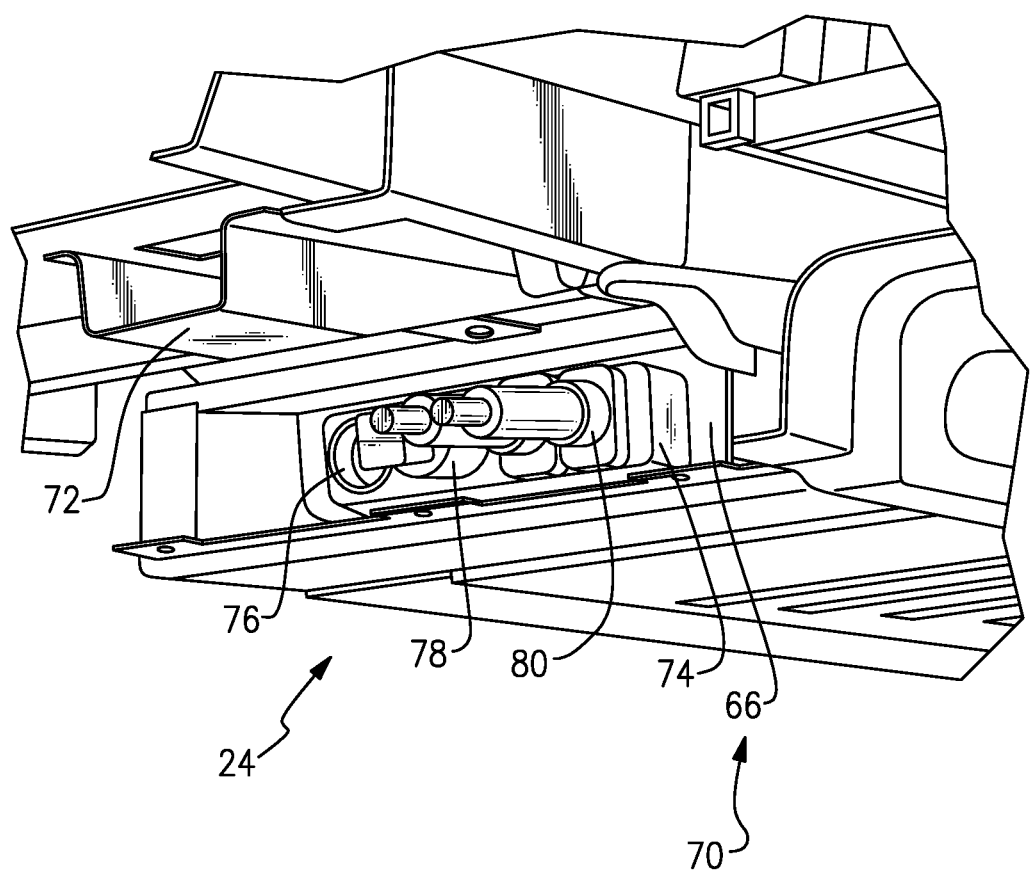
FIG. 3 illustrates a battery assembly mounted adjacent an underbody of the electrified vehicle.

FIG. 3 illustrates the battery assembly 24 mounted to the electrified vehicle 12, and in particular mounted adjacent an underbody 70 of the electrified vehicle 12. Specifically, the battery assembly 24 is attached to sheet metal 72 forming a portion of an underside of a frame of the electrified vehicle 12. The underbody 70 of the electrified vehicle 12 is a potentially corrosive environment due to potential exposure to the elements. While the battery assembly 24 is mounted adjacent the underbody of the electrified vehicle 12, this disclosure extends to battery assemblies and header plates mounted in other areas of the electrified vehicle, including other corrosive environments.

In FIG. 3, a plate 74, which may be referred to as a header plate, is connected to a wall 66 of the battery assembly 24 and configured to support at least one electrical connector relative to the battery assembly 24. The plate 74 is connected to the wall 66 directly, or via a seal, such that it is substantially air and water tight.

Figure 4:
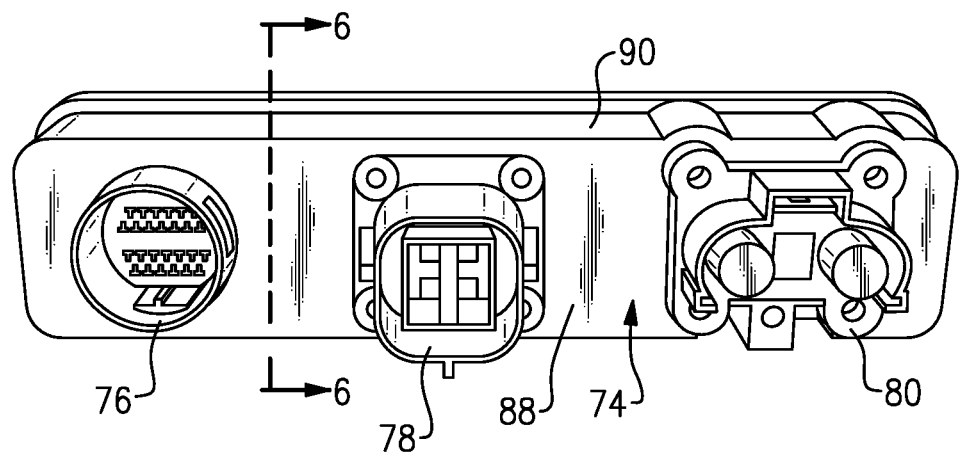
FIG. 4 illustrates an example header plate with three example electrical connectors attached thereto.

In the example of FIG. 3, the plate 74 supports three electrical connectors 76, 78, 80 relative to the battery assembly 24. The plate 74 and electrical connectors 76, 78, 80 are also shown in FIG. 4. The electrical connectors 76, 78, 80 are electromechanical devices used to join electrical terminations and create electrical circuits. The electrical connectors 76, 78, 80 may be female or male components (i.e., sockets or plugs). The electrical connectors 76, 78, 80 are made of a plastic material in this example, but this disclosure is not limited to plastic electrical connectors.

Figure 5:
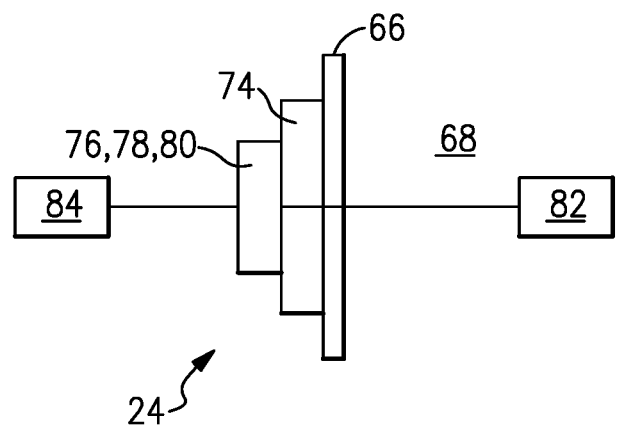
FIG. 5 is a schematic, cross-sectional view illustrating the arrangement of the header plate and electrical connectors relative to components inside and outside the battery pack.

With reference to FIG. 5, the plate 74 supports the electrical connectors 76, 78, 80 relative to the wall 66, and the electrical connectors 76, 78, 80 each electrically connect a component 82 in the interior 68 of the battery assembly 24 to a component 84 outside the battery assembly 24. In one example, the electrical connectors 76, 78, 80 electronically connect the battery assembly 24 to components such as a motor, an inverter, DC-to-DC converter, or another electronic component outside the battery assembly 24. This disclosure is not limited to plates mounted to a battery assembly, however, and can extend to connections between other high voltage system components such as an inverter, charger, DC-to-DC converter, and/or electric motor. While electrical connectors are referred to herein, this disclosure could extend to fluid connectors configured to fluidly couple components inside the battery assembly 24 to components outside the battery assembly 24.

Figure 6:
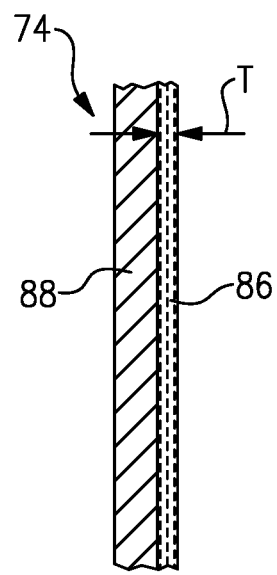
FIG. 6 is a cross-sectional, broken view taken along line 6-6 from FIG. 4.

In this disclosure, the plate 74 is formed of a single piece of aluminum (Al) alloy material. Further, the plate 74 is formed without any joints or seams. The plate 74 is also coated with a layer of ceramic material 86 (FIG. 6). In this sense, the plate 74 consists of a seamless, aluminum (Al) alloy structure and a layer of ceramic material 86.

Figure 7:
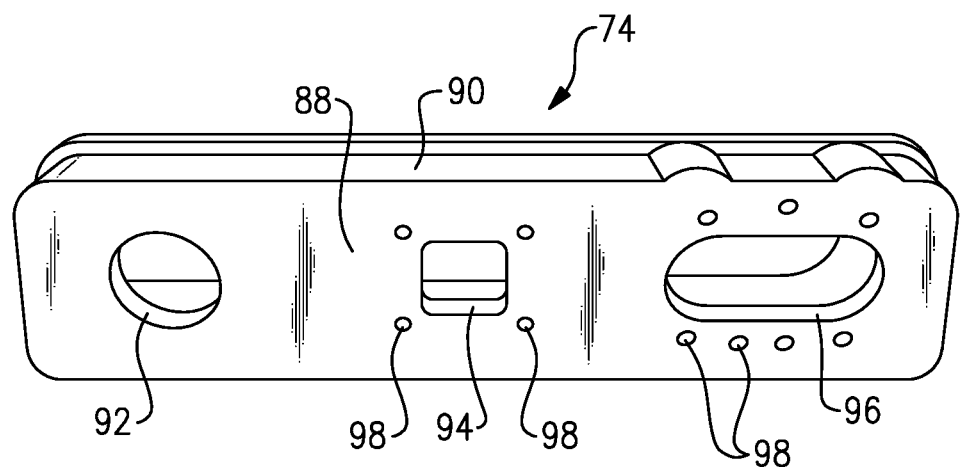
FIG. 7 illustrates the example header plate without any electrical connectors.

The plate 74, in this disclosure, includes a main body section 88 and a perimeter flange 90. The perimeter flange 90 extends about the entirety of a perimeter of the main body section 88 and projects in a direction normal to a plane of the main body section 88. The perimeter flange 90 directly contacts the wall 66, in one example. In another example, a seal may be arranged between the perimeter flange 90 and the wall 66. The main body section 88 covers one or more openings in the wall 66 and itself includes a plurality of openings 92, 94, 96 (FIG. 7) configured to support the electrical connectors 76, 78, 80, respectively.

The openings 92, 94, 96 are sized and shaped to interface with the particular size and shape of the electrical connectors 76, 78, 80. The openings 92, 94, 96 may be any shape. As shown, they are circular, rectangular, and ovular, respectively. The openings 92, 94, 96 may be configured to permit the electrical connectors 76, 78, 80 to snap-fit relative to the plate 74 or be attached to the plate 74 using fasteners, such as threaded fasteners. As such, threaded openings 98 configured to receive threaded fasteners may be arranged relative to some of the openings 92, 94, 96.

A seal, such as a rubber or ethylene propylene diene monomer (EPDM) O-ring, may be positioned between the plate 74 and one or more of the electrical connectors 76, 78, 80. Alternatively, one or more of the electrical connectors 76, 78, 80 may be directly connected to the plate 74 without an intervening seal.

The layer of ceramic material 86 is an electro ceramic coating (ECC) in one example. The layer of ceramic material 86 completely coats at least the main body section 88 of the plate 74. The layer of ceramic material 86 provides an effective seal between the plate 74 and the electrical connectors 76, 78, 80. The layer of ceramic material 86 may be applied using a known technique, such as plasma deposition, and exhibits a thickness T of between 3 to 50 μm. In a particular example, the thickness T is about 8 μm. Such a thickness provides effective resistance to corrosion in particular when there is a seal such as an O-ring directly between the plate 74 and the electrical connectors 76, 78, 80.

Other than the layer of ceramic material 86, plate 74 is made of A304, which is known as K-Alloy. K-Alloy is an aluminum (Al) alloy which includes a low percentage of copper (Cu) by weight. This disclosure extends to other aluminum (Al) alloys with a low percentage of copper (Cu), such as aluminum (Al) alloys with less than 0.10 weight percent of copper (Cu), and in particular with less than or equal to 0.08 weight percent of copper (Cu). Such materials exhibit good corrosion resistance. Coupled with the electro ceramic coating, the aluminum (Al) alloy plate effectively maintains seals with the electrical connectors 76, 78, 80 by resisting corrosion, and without being unduly expensive or difficult to manufacture. Other example aluminum (Al) alloys include ADC12, A380, ADC3, A356, and A413.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for an electrified vehicle, comprising:
 a plate configured to support an electrical connector, wherein the plate includes aluminum (Al) alloy and is coated with a layer of ceramic material;
 a wall; and
 a plurality of battery cells arranged within the wall, wherein the plate is a header plate attached to the wall such that the entire plate is on an opposite side of the wall as the plurality of battery cells, and wherein the electrical connector electronically connects the battery cells to at least one electronic component outside the wall, wherein the layer of ceramic material provides a seal between the plate and the electrical connector, wherein the plate includes a main body section, wherein the plate includes a perimeter flange extending about the entirety of the main body section and projecting in a direction normal to a plane of the main body section toward the wall such that the perimeter flange contacts the wall either directly or indirectly, and wherein the main body section includes an opening sized and shaped to receive the electrical connector, wherein the main body section covers one or more openings in the wall when the plate is viewed from an exterior perspective.

2. The assembly as recited in claim 1, wherein the ceramic material is an electro ceramic coating (ECC).

3. The assembly as recited in claim 1, wherein the layer of ceramic material has a thickness of between 3 to 50 µm.

4. The assembly as recited in claim 3, wherein the layer of ceramic material has a thickness of about 8 µm.

5. The assembly as recited in claim 1, wherein the electrical connector is made of a plastic material.

6. The assembly as recited in claim 1, wherein the plate is made of A304.

7. The assembly as recited in claim 1, wherein the plate is made of an aluminum (Al) alloy with less than 0.10 weight percent of copper (Cu).

8. The assembly as recited in claim 1, wherein the electrical connector is snap-fit to the plate.

9. The assembly as recited in claim 1, wherein the electrical connector is connected to the plate by at least one fastener.

10. The assembly as recited in claim 1, wherein the plate is mounted adjacent an underbody of the electrified vehicle.

11. An electrified vehicle, comprising:
a battery assembly arranged adjacent an underbody of the electrified vehicle, the battery assembly including:
a wall;
a plurality of battery cells arranged within the wall;
an electrical connector; and
a plate connected to the wall and the electrical connector, wherein the electrical connector electronically connects the battery cells to at least one electronic component outside the wall, and wherein the plate includes aluminum (Al) alloy and is coated with a layer of ceramic material such that the layer of ceramic material provides a seal between the plate and the electrical connector, wherein the plate includes a main body section, wherein the plate includes a perimeter flange extending about the entirety of the main body section and projecting in a direction normal to a plane of the main body section toward the wall such that the perimeter flange contacts the wall either directly or indirectly, and wherein the main body section covers one or more openings in the wall when the plate is viewed from an exterior perspective.

12. The electrified vehicle as recited in claim 11, wherein:
the ceramic material is an electro ceramic coating (ECC), and
wherein the plate is made of A304.

13. The electrified vehicle as recited in claim 12, wherein the layer of ceramic material has a thickness of about 8 µm.

14. The electrified vehicle as recited in claim 11, wherein the electrical connector is made of a plastic material.

15. The electrified vehicle as recited in claim 11, wherein the plate is made of an aluminum (Al) alloy with less than 0.10 weight percent of copper (Cu).

16. The electrified vehicle as recited in claim 11, wherein the plate is a header plate attached to the wall such that the entire plate is on an opposite side of the wall as the plurality of battery cells.

* * * * *